3,273,965
PROCESS OF PREPARING A BURDEN FOR USE IN ELECTRO-THERMAL FURNACES
Friedbert Ritter, Buschhof, near Konigswinter, Germany, Franz Rodis, deceased, late of Bad Hersfeld, Germany, by Hildegard Rodis, nee Arend, heiress, Konrad Reuter, Augsburg, Germany, and Hugo Querengasser, Hermulheim, near Cologne, Germany, assignors to Knapsack Aktiengesellschaft, a corporation of Germany
No Drawing. Continuation of application Ser. No. 186,566, Feb. 23, 1962, which is a division of application Ser. No. 624,750, Nov. 28, 1956. This application Apr. 20, 1965, Ser. No. 450,263
Claims priority, application Germany, Dec. 2, 1955, K 27,495
1 Claim. (Cl. 23—223)

This application is a continuation of application Serial Number 186,566, filed February 23, 1962, now abandoned, which in turn is a division of application Serial Number 624,750 filed November 28, 1956, and now abandoned.

The present invention relates to a process of preparing a burden for use in electro-thermal furnaces.

In various electro-thermal processes, for example in the production of carbide, phosphorous, ferro-alloys, silicon carbide and other substances, the individual components are generally mixed with one another in the form of lumps and in a predetermined proportion, and the resulting mixture is then introduced into the electric furnace.

Since the operation of an electro-thermal furnace depends both on the composition of the mixture for charge (burden) and, more especially, on the electric conductivity of the reaction mixture, it has already been attempted to influence said conductivity and thereby to regulate the resistance of the furnace, which depends on such conductivity. Thus, for example, attempts have been made to use a coke with a suitable electric conductivity as carbon component. It is desirable in this case that the coke used has a low conductivity and especially a small temperature coefficient of conductivity, so that the furnace can be operated under a fairly high tension which, on its part, displays a favorable effect on the consumption and transfer of current. Generally, however, it was necessary to tolerate the conductivity of some coke just available in an attempt by corresponding measures in the attendance of the furnace to balance the seldom fulfilled requirements demanded of a burden, a fact which often involved great disadvantages.

It is known that the tension under which an electric furnace can be operated depends on the resistance of the coke used. If the coke is divided in the burden in lumpy form, a conduction is brought about in that the individual coke particles come into contact with one another. If, as in the case of a phosphorus furnace, the remaining burden is of a fine nature, it trickles through the individual coke particles to bring about, in an especially easy manner, a contact and a conduction between said coke particles. These particles have the tendency to separate as a result of their low specific gravity and, accordingly, to form current bridges.

In most electro-thermal processes, the mixture for charge (burden) contains carbon in a proportion of between about 10% and about 20%. If care is taken that the carbon present, for example in the form of coke, be finely divided in the mixture for charge so as to exclude a bridge formation between the electrodes, a fact which hitherto could not completely be observed in industry, the coke will generally entertain its function as an electric, however considerably resistant, conductor only beneath the electrode. The current then distributes between the electrode and the bottom of the furnace in the form of a truncated cone. The fusion cone so formed by the heated material to undergo reaction is constantly regenerated from above by fresh burden components. The fusible reaction material is passed through the aforesaid highly heated, cone-like and conducting resistance element to complete the reaction and is then discharged in the lower part of the furnace. To this end, it is of course most advantageous to use a coke with a relatively poor conductivity which often possesses at the same time a good chemical reactivity.

In the aforesaid mixture for use in a phosphorus furnace, the weight proportion of the coke in said mixture is 14%, corresponding to a weight proportion of the crude phosphate plus silicic acid in the form of quartz gravel to coke of 1:0.17. The proportion of volume of crude phosphate plus the above gravel to coke is, however, 1:0.4; this means that the mixture for use in a phosphorous furnace contains the coke in a proportion of 29% by volume.

The electric conductivity of the burden which depends on the proportion of coke that is a more or less good conductor, generally brings about an increased flow of current whereby the burden is untimely heated to a higher and undesirable temperature.

This increased flow of current implies inevitably a certain bridge formation in the upper part of the furnace material.

It should also be noted that the temperature in the reaction zone, for example in a carbide furnace, is considerably above 2000° C. and that the fusible carbide possesses a considerable electric conductivity, so that the furnace can only be operated under a relatively low electric tension; in addition, the carbide furnace tends always to side shunts, in which case a more or less great part of the current takes the direct way from one electrode to the other, whereby, in connection with the strong heating of the burden associated with losses in current, the furnace resistance is reduced so that the electrodes must inevitably be lifted. This implies a reduction of the density of energy and of the temperature in the reaction zone proper so as to impair the quality of the resulting carbide. It is true that the furnace resistance may also be increased by the addition of lime in a stoichiometrical excess quantity, but such addition further impairs the quality of the carbide obtained.

In the known electro-thermal processes special care has been attributed to the determination of the chemical composition of the burden, that is to say the stoichiometrical proportions of the raw materials to one another and their reactivity with one another, a fact which finds its explanation in that the various components of the burden are mixed with one another in a predetermined proportion and then introduced into the furnace.

As stated above, it is the composition of the burden and the conductivity of the reaction mixture which are of decisive importance in putting an electric furnace into operation. The operative steps which had to influence said conductivity, however, did not completely bring about the desired effect or, on the other hand, involved considerable disadvantages in the attendance of the furnace.

The present invention provides a process of preparing a burden for use in electro-thermal furnaces which enables the edectric conductivity of said burden to be influenced and the resistance of said furnace to be regulated, wherein between about 20% and 100% by weight of the current-carrying component which depends substantially on the composition and granulation of the burden components, are briquetted with the use of the semi-conducting components and insulators present in said burden to obtain insulated briquets, and wherein the total mixture composed of the burden components which, according to the proportion to be briquetted, are present in a fine-grained, slack- to powder-like state, is briquetted and then used.

In the manner described, the electric conductivity of the burden can be varied within wide limits by mixing and briquetting, in a fine-grained form, the conducting component—in most cases various kinds of carbon—with a non-conducting component of the burden. It has been found that such mixture yields briquets which remain non-conducting even at a relatively high temperature.

The conductivity of these briquets sets in only at so high a temperature that not only no disadvantage is done to the attendance of the furnace, but that it is even desirable.

By varying the quantity of carbon which is briquetted with a non-conducting component of the burden and, on the other hand, by varying the proportion of briquets added to the total burden, it is possible to use the carbon which must be introduced as non-conductor, in any desired proportion and, in this manner, practically to regulate the conductivity of the total burden as desired.

As has already been stated above, the part of the conducting component to be embedded by briquetting depends chiefly on the composition and granulation of the burden components. However, other factors are also of importance, such as the tension applied, the distance between the electrodes, the number of electrodes and their arrangement, for example a parallel or triangular arrangement, and the form of the furnace, for example a round-shaped, a rectangular or a triangular furnace.

In the process of this invention, the total burden necessary may be briquetted to insulate the employed current carrying component with the use of the semi-conducting components and insulators present in the burden, that is to say the total mixture of the fine granular, slack-like to powdery burden components is briquetted and then used in the form of common briquets.

These common briquets which consist of a part of the burden components and which have a fine granular structure, may also be mixed with the other burden components present in a coarse and lumpy form. The term "coarse and lumpy form" as used herein means lumps having a diameter greater than 10 mm. and, generally, between about 10 mm. and about 40 mm., whereas fine grains have a diameter of less than 10 mm.; the grains of less than 10 mm. in diameter which are to be briquetted and have been separated from the coarse grain, for example by sieving, may previously be further reduced in size by grinding.

The total quantity of the components present as semi-conductors and insulators may be used as fine granular common briquets in admixture with between about 50% and 100% by weight of the conductor which depends substantially on the composition and granulation of the burden components, in which case the remaining proportion of between about 50% and 0% of the current carrying component is used in a coarse and lumpy form.

Experiments have shown that it may be advisable to use, for example at least about 15% of the current conductor in a lumpy form, so that advantageously the total amount of semi-conductors and insulators is used in the form of common briquets in admixture with between about 50 and about 85% of the current conductors, whilst the remaining proportion of the current conductors of between about 50% and about 15% is used in the form of lumps.

On the other hand, the total quantity of the current carrying components may be used as commonly shaped, fine-grained briquets in admixture with between about 15% and 100% by weight of the components used as semi-conductors and insulators which depend essentially on the composition and granulation of the burden components, in which case the remaining proportion of the components used as semi-conductors and insulators, i.e. between about 85% and 0%, may be used in the form of coarse lumps.

Experiments have also shown that it may be advantageous to use at least about 20% of the semi-conductors and insulators in a lumpy form so that the total quantity of the current conductors is used as commonly shaped briquets in admixture with between about 15% and about 80% by weight of the semi-conductors and insulators, whilst the remaining proportion of the semi-conductors and insulators, i.e. between about 85% and about 20%, is used in the form of lumps.

It must be emphasized once again that in comparison with the extreme case where the total burden is briquetted, that is 100% of the conductors plus 100% of the semi-conductors and insulators, at least about 15% of the current conductors or at least about 20% of the semi-conductors and insulators must be used in a lumpy form in addition to the briquets made from the major and remaining proportion of both components in order to produce an effect in the attendance of the furnace. It should be understood that it is also possible, for some reason or other, to use in a lumpy form only 5% or 10% of the current conductors or only 5%, 10% or 15%, of the semi-conductors and insulators, but such procedure does not differ fundamentally from the case where the total burden is briquetted.

As has been outlined above, the process of this invention is applicable to a series of electrothermal furnaces, in which a burden of a different composition is used and which, accordingly, serve to produce and obtain various industrial products. Experiments proved that the process of this invention is especially suitable for use in electrothermal carbide and phosphorus furnaces.

The semiconductors and insulators used in preparing a burden for use in an electro thermal phosphorus furnace consist of crude phosphate and silica in the form of quartz gravel whilst the current carrying carbon component may consist of anthracite, crude lignite, low temperature coal, high-bituminous lignite coke and coke, or of mixture of these substances.

As burden, there may be used for example, a briquet shaped mixture of crude phosphate, the above quartz gravel and coke breeze, in which case the coke portion used must have a grain size of at least 6 mm. Thus, for example, the fine granular and commonly shaped briquets made from the total quantity both of the crude phosphate and the coke used, the latter having grain size of at least 6 mm.—may be added to the total amount of the above quartz gravel which is still present in a coarse and lumpy form.

The commonly shaped, fine granular briquets may, however, also consist of the total amount of crude phosphate and of between about 50% and 100% by weight of coke which depends essentially on the composition and granulation of the burden components, in which case the remaining proportion of coke, i.e. betwen about 50% and 0% by weight, may be added to the briquets together with the total amonut of the above quartz gravel in a coarse and lumpy form. For the reasons set forth in parent application S.N. 186,566 in discussing the burden of a carbide furnace, it is also suitable in this case that the total amount of crude phosphate be briquetted only in admixture with between about 50% and about 70% by weight of the coke and that, accordingly, the remaining proportion of coke, i.e. between about 50% and about 30% be again used in a lumpy form together with the total amount of the quartz gravel. The use of coke in lumpy form and in a proportion of only 20% and 10% has, in this case, no important effect, so that it is possible and, for simplicity's sake, even advisable to use the total amount of coke and the total amount of crude phosphate from the outset as commonly shaped briquets.

Inversely, it is possible to use the total amount of coke which must have a grain size of at least 6 mm., together with between about 20% and 100% by weight of the crude phosphate in the form of commonly shaped briquets, whilst the remaining proportion of the crude phosphate, i.e. between about 80% and 0%, is used in a coarse and lumpy form together with the total amount of the above quartz gravel. For the reasons set forth above it is also suitable in this case to briquet only between about 20% and about 75% of the crude phosphate with the total amount of coke and, accordingly, to use the remaining proportion of the crude phosphate, i.e. between about 80% and about 25%, in a lumpy form together with the total amount of the above quartz gravel.

Advantageously, the process of this invention when used for producing phosphorus in an electrothermal furnace comprises providing at least one electrically conducting substance in the form of both lumpy and fine-grained particles constituting from 50 to 85 percent by weight of the electrically conducting substance. The expression "fine-grained particles" means particles having a grain size of 6 to substantially less than 10 mm. with the lumpy particles having a grain size from 10 to 50 mm. Additionally, electrically non-conducting substances are provided as both lumpy and fine-grained particles with the fine-grained particles constituting from 15 to 80 percent by weight proportion of the electrically non-conducting substances. The electrically non-conducting substances are crude phosphate or phosphate rock and quartz gravels. The fine-grained phosphate rock particles have a grain size of substantially less than 10 mm. with the lumpy particles having a grain size of 10 to 40 mm., while the fine-grained quartz gravel particles have a grain size of substantially less than 6 mm. with the lumpy particles being from 6 to 50 mm. The fine grain electrically conducting and electrically non-conducting particles are compressed into briquets which have an electric conductivity smaller than the electrically conducted substance alone. The briquets and the remaining lumpy electrically conducting and non-electrically conducting particles are then introduced into the electrothermal furnace.

In contrast to the burden used in carbide furnaces which contains only two components, i.e. a carbon-containing and a lime-containing component, the burden used in an electrothermal phosphorus furnace consists of three components, i.e. a carbon component, crude phosphate and the above quartz gravel.

Therefore, in the case of a phosphorus furnace the burden may be prepared by briquetting the coke which has a grain size of at least 6 mm. in a weight proportion of between about 20% and 100% together with between about 5% and 100% by weight of the crude phosphate, whilst the corresponding remaining proportions of coke, i.e. between about 80% and 0%, and crude phosphate, i.e. between about 95% and 0%, are used together with the total amount of the above quartz gravel in a coarse granular and lumpy form.

It has already been stated above that in the case where the total amonut of coke used in the burden is briquetted about 20% of the crude phosphate are necessary for briquetting. Thus, when, as has been mentioned in the last instance, only 20% of the coke used is briquetted, it will be necessary to use at least about 4 to 5% of the total amount of crude phosphate.

It is, however, advisable and useful to observe certain limits so that, generally, not more than between about 20% and about 70% of the coke, and between about 5% and about 75% of the crude phosphate will be used in the form of commonly shaped briquets, whilst the corresponding and remaining proportions of coke, i.e. between about 80% and about 30%, and crude phosphate, i.e. between about 95% and about 25%, will be used in a lumpy form together with the total amount of silica in the form of quartz gravel. When these limits are surpassed, it is again useful to briquet the total amount of coke with the total amount of crude phosphate from the very beginning.

Further possibilities which likewise fall within the scope of this invention consist in incorporating the above quartz gravel partially or wholly into the commonly shaped briquets of coke, or other carbon component and crude phosphate.

The following paragraphs are intended more fully to illustrate the alleged invention:

In carrying out the process of this invention it is possible to influence the electric conductivity of a burden for use in electrothermal furnaces and thereby to regulate the resistance of said furnaces in that the well conducting components are briquetted and embodied in the poor conductors or non-conducting reaction components so as to be insulated. Such procedure has the effect to increase the electric resistance of the burden, since now the individual reaction components are used, at least partially, in the form of briquets consisting of dust or fine grains, whilst only the corresponding remaining amounts of the reaction components are used in a lumpy form to modify the electric furnace resistance as desired.

In the case where the carbon-containing components of the burden are concerned, it is especially suitable to use the material for making the burden partially in a lumpy and granular form, and partially in a slack-like and pulverulent form.

By suitably applying the process of this invention, the electric conductivity of the burden is reduced in a favorable manner to a minimum value in the upper part of the furnace, and may even be at about zero. The electric conductivity increases gradually only in the lower part of the furnace in which the reaction proper takes place, and thereby gives rise to a concentration of the electric current in the reaction zone. The proportion of the lumpy and well-conducting components, for example carbon components, with respect to the whole burden, depends essentially on the particular electric conditions, for example the distance between the electrodes, the tension applied and the electric conductivity of the burden components, and depends also on the material to be produced and on the type of the furnace.

Under certain conditions it may be advantageous to use the total quantity of the individual reaction components in the form of briquets made from dust, powder or breeze and/or of mixtures thereof.

The briquets made from the reaction mixture may be prepared by conventional methods, for example by granulating or briquetting.

In carrying out the process of the invention shaped bodies may be obtained which practically exhibit no electric conductivity, since all good conductor particles, for example, coke particles, are separated from one another by an insulating material, such as lime, phosphate, etc. and, therefore can no longer participate in the conduction of current in the upper part of the furnace. The so-called "low temperature briquets" are fundamentally different from the briquets used in this invention which have been prepared from crude phosphate and coke breeze and, optionally, the above quartz gravel or sand, and in which the carbon particles are insulated from one another by the crude phosphate in which they are embedded. These low temperatures briquets are prepared from a mixture of crude phosphate, coal and pitch which after having been shaped, is carbonized at a low temperature, whereby the mixture becomes remarkably solid. These low temperature briquets however are capable of conducting electric current. In these latter briquets the carbon component is present in the form of coherent fine wires and bridges, so that the aforesaid component can easily be charged with the conduction of the current. These carbon bridges have been determined by micro-photographs.

By a test made in a phosphorus furnace, it was found that when low temperature briquets were used the slag had a temperature of only 1420° C. whereas under identical conditions the temperature of the slag was 1620° C. using a normal mixture in combination with briquets according to the invention. As compared with the process of the invention the use of low temperature briquets involved only a very poor dephosphorization as a result of said lower temperature and the slag still contained 2–3% of $P_2O_5$.

The energy supplied was the same in both experiments; the current potential was 48 volts and the current intensity 1200 amperes. It is obvious that in the case where the low temperature briquets were used the current could not be concentrated to act on the proper fusion zone, but was previously partially leaked off to the side.

In the process of the invention there may be used as carbon components which are to be insulated by embedding, the fine substances, such as coke breeze, obtained in the production of lump coke or anthracite or in the production of carbide. This is of special importance in order successfully to apply the present process, since it is just these fine granular carbon substances that increase the stability of the shaped or pressed articles or briquets made therefrom in combination with a lime component; as experiments have shown, these substances form a kind of skeleton so as to facilitate the removal of air that has been included during the pressing operation. The fine-grained proportion of carbon may contain limited amounts of dust so that fine coke dust obtained on dust removal filters, in cyclones or electric dust separators and which hitherto was almost useless, can be utilized in an economic manner. Part of the carbon may also be replaced by crude lignite.

Since the components to be shaped may introduce into the mixture considerable amounts of adhering air, it may be of advantage to remove the major part of said air from the mixture, for example with the use of the preliminary pressure of the pressing devices.

The briquets obtained from the various and mixed components offer the particular advantage of possessing an excellent storeability. Already after storage for some hours they are so solid that they can be processed to obtained carbide without undesirable formation of dust.

The process of the invention may be performed in various ways:

In the production of phosphorus according to the invention the burden may correspondingly consist of:

(a) Briquets of crude phosphate-coke and the above quartz gravel (b) Crude phosphate/coke briquets and lumpy quartz gravel (c) Crude phosphate/coke briquets, lumpy quartz gravel and lump coke (d) Crude phosphate/coke briquets, lumpy quartz gravel and lumpy crude phosphate (e) Crude phosphate/coke briquets, lumpy quartz gravel, lumpy crude phosphate and lumpy coke.

Further combinations may, however, also be used.

It should also be noted that in a phosphorus furnace the carbon-containing raw material is not separated from the crude phosphate. This means that in the production of phosphorus the coke used in the briquets is not allowed to have a grain size below 6 mm., whilst in a carbide furnace the coke used for briquetting, has a grain size of at most 6 mm. The reasons for such procedure must be seen in that an electrothermal furnace must be charged with a fairly fine and dust-like material, so that the coke which does not separate upon decomposition of the briquets in a phosphorus furnace must be present from the very outset in slack form with a size in diameter of at least 6 mm., and not in a finer form. In a carbide furnace, however, the more fine-grained carbon component of the briquets—i.e. with a grain size of less than 6 mm.—separates instantaneously upon decomposition of said briquets so that no undesired fine material is obtained.

The following examples serve to illustrate the invention, but they are not intended to limit it thereto; the parts being by weight unless otherwise stated.

PRODUCTION OF PHOSPHORUS

*Example 1*

Hitherto the following method was used: 260 parts of coarse grained crude phosphate containing 70% of $Ca_3(PO_4)_2$ were mixed with 103 parts of silica in the form of coarse-grained quartz gravel and 62 parts of lump coke and the resulting mixture was introduced into an electric furnace. The furnace used is an electric furnace usually and suitably used for the production of phosphorus. The crude phosphate used had a grain size of up to about 12 mm., the above quartz gravel of between about 15 mm. and about 30 mm. and the coke of between about 20 mm. and about 40 mm.

The working order of the electric furnace using the above mixture is irregular and great care must be taken to regulate the furnace. In addition, the waste gas has a temperature of 540° which is inconvenient and even inadmissable.

In carrying out the process of this invention however for example 260 parts of fine-grained, fairly ground and crude phosphate containing about 70% of $Ca_3(PO_4)_2$ and 32 parts of coke having a grain size of at least 6 mm. are shaped to obtain briquets. The briquets so produced are mixed with 103 parts of the above quartz gravel, 30 parts of residual coke present in the form of lumps as indicated above, and the resulting mixture is then introduced into the electric furnace. It is evident that the total amount of the crude phosphate together with about 50% by weight of the coke is used in the form of commonly shaped briquets, whilst the residual coke is used in the form of lumps together with the total amount of the above quartz gravel.

The waste gas has now a temperature of only 890° C., since the charge is poorer in conducting constituents as a result of briquetting about 50% of the total amount of coke with the aid of the total amount of the crude phosphate.

Generally it is advisable to operate as follows: the crude phosphate is separated, for example by sieving, so that a phosphate having a grain size and/or a diameter of less or more than 10 mm. is obtained. The crude phosphate with a diameter of more than 10 mm. and up to about 40 mm. is then used in the form of lumps, whilst the crude phosphate proportion having a size of less than 10 mm. in diameter is finely ground and then used for mixed briquetting according to this invention.

The above quartz gravel and the lump coke used in addition to the mixed briquets have a grain size of between about 6 mm. and about 50 mm. in diameter, generally between about 10 mm. and 40 mm.; as in the case of a burden for use in a carbide furnace, it is rather difficult to indicate accurate limits and it is understood that in briquetting larger or smaller parts may also be used as burden components or for briquetting. The coke proportion briquetted in the case of a phosphorus furnace has a grain size of not less than 6 mm. and generally has a grain size of between about 6 mm. and about 10 mm.; this is contrary to the case where a carbide furnace is concerned where the coke proportion to be briquetted must have a grain size of less than 6 mm.

*Example 2*

According to the invention the total amount of the crude phosphate may be briquetted with the total amount of the coke to obtain briquets which are then mixed with the total amount of the lumpy quartz gravel; the mixture obtained is then introduced into the electric furnace. For example, 350 parts of crude phosphate which contain about 70% by weight of $Ca_3(PO_4)_2$ and have been obtained as fine-grained proportion upon sieving, that is in a grain size of less than 10 mm., are further comminuted by grinding, then mixed with 68 parts of coke having a grain size of not less than 6 mm., generally between 6 mm. and 10 mm., and the whole is briquetted. The resulting briquets are then introduced in the phosphorus furnace together with 120 parts of lumpy quartz gravel having a grain size of between about 6 mm. and about 40 mm. in diameter.

*Example 3*

The total amount of the carbon component is briquetted together with a certain proportion of the crude phosphate and the residual crude phosphate is then used in lumpy form in combination with the total amount of the above quartz gravel. For example, a mixture of 68 parts of coke and 160 parts of crude phosphate are shaped to obtain briquets, whilst 190 parts of crude phosphate and 120 parts of the above quartz gravel are added to these briquets in the form of lumps and the resulting burden is then introduced in the electric furnace. The components used for making the briquets and the unbriquetted burden proportions have a grain size and/or lump size as indicated in Examples 1 and 2.

*Example 4*

This example evidences that parts of the crude phosphate used may be briquetted with parts of the coke used as carbon component whilst the residual proportions of the total amount of crude phosphate and the total amount of the coke are added to the fine-grained briquets in the form of lumps together with the total amount of the above quartz gravel used. For example, the briquets may consist of 70 parts of crude phosphate and 41 parts of coke. To these briquets may further be added 380 parts of crude phosphate and 27 parts of coke as well as 120 parts of the above quartz gravel. The grain and lump size is indicated in Examples 1 and 2.

What is claimed is:

In the process of producing phosphorus in an electrothermal furnace, the improvement comprising (1) providing at least one electrically conducting substance in the form of both lumpy and fine-grained particles, the fine-grained particles constituting from 50–85% by weight of the electrically conducting substance, the fine-grained particles having a grain size of 6 to substantially less than 10 mm., the lumpy particles having a grain size of 10 to 50, and the electrically conducting substance being selected from the group consisting of anthracite, crude lignite, high bituminous lignite coal, and coke; (2) providing electrically non-conducting substances in the form of both lumpy and fine-grained particles, said fine-grained particles constituting from 15–80% by weight proportion of the electrically non-conducting substances, said electrically non-conducting substances being phosphate rock and quartz gravel, the fine-grained phosphate rock particles having a grain size of substantially less than 10 mm., the lumpy phosphate rock particles having a grain size of 10 to 40 mm., the fine grain quartz gravel particles having a grain size of substantially less than 6 mm., and the lumpy quartz particles having a grain size of 6 to 50 mm.; (3) compressing the fine-grained electrically conducting and electrically non-conducting particles into briquets having an electric conductivity smaller than the electrically conducting substance alone; and (4) introducing the briquets and the lumpy electrically conducting and electrically non-conducting particles into the electrothermal furnace.

References Cited by the Examiner

UNITED STATES PATENTS

| | | | |
|---|---|---|---|
| 859,086 | 7/1907 | Landis | 23—223 |
| 1,334,474 | 3/1920 | Waggaman | 23—223 |
| 1,818,662 | 8/1931 | Weigel et al. | 23—223 |
| 1,867,241 | 7/1932 | Weigel | 23—223 |
| 1,938,557 | 12/1933 | Gooch et al. | 23—223 |
| 2,897,057 | 7/1959 | Burgess | 23—223 |

OSCAR R. VERTIZ, *Primary Examiner.*

MAURICE A. BRINDISI, BENJAMIN HENKIN, E. STERN, *Assistant Examiners.*